(12) United States Patent
Minaai (10) Patent No.: US 7,305,853 B2
(45) Date of Patent: Dec. 11, 2007

(54) METHOD OF MANUFACTURING A GLASS PANEL

(75) Inventor: Tetsuo Minaai, Osaka (JP)

(73) Assignee: Nippon Sheet Glass, Co., Ltd., Osaka (JP)

( * ) Notice: Subject to any disclaimer, the term of this patent is extended or adjusted under 35 U.S.C. 154(b) by 503 days.

(21) Appl. No.: 10/494,501

(22) PCT Filed: Feb. 21, 2003

(86) PCT No.: PCT/JP03/01953

§ 371 (c)(1),
(2), (4) Date: May 3, 2004

(87) PCT Pub. No.: WO03/084892

PCT Pub. Date: Oct. 16, 2003

(65) Prior Publication Data

US 2005/0103052 A1    May 19, 2005

(30) Foreign Application Priority Data

Apr. 11, 2002  (JP) ............................. 2002-109444

(51) Int. Cl.
    C03B 23/203    (2006.01)
    E06B 3/24      (2006.01)
(52) U.S. Cl. ............................................. 65/34; 65/36
(58) Field of Classification Search .................... 65/34, 65/36; 156/104, 107, 109, 286
    See application file for complete search history.

(56) References Cited

U.S. PATENT DOCUMENTS 5,902,652 A * 5/1999 Collins et al. ................ 428/34
6,468,610 B1 * 10/2002 Morimoto et al. ............ 428/34
6,506,272 B1 * 1/2003 Aggas ......................... 156/109
6,541,083 B1 * 4/2003 Landa et al. .................. 428/34
6,641,689 B1 * 11/2003 Aggas ......................... 156/109
6,901,772 B1 * 6/2005 Eberhardt et al. ............. 65/34

FOREIGN PATENT DOCUMENTS

| CN | 1126504       | 7/1999  |
| EP | 1199289 A1    | 4/2002  |
| JP | 11-324509     | 11/1999 |
| JP | 11-324509 A   | 11/1999 |
| JP | 2000-119046 A | 4/2000  |
| JP | 2001-058852 A | 3/2001  |
| WO | WO-95/01493 A1| 1/1995  |

* cited by examiner

Primary Examiner—Carlos Lopez
(74) Attorney, Agent, or Firm—Fulbright & Jaworski LLP (57) ABSTRACT

A method of manufacturing a glass panel and a glass panel manufactured such a method, comprising a pair of glass plates opposed to each other to define a void therebetween by a number of space-maintaining members arranged along plate surfaces with predetermined intervals between rows, and a thermally meltable seal member for joining the glass plates throughout a circumference thereof to be hermetically sealed by a heat-joining process. The void between the glass plates being decompressed by a decompressing process, and the distance between outermost rows of the space-maintaining members and peripheral edges of the glass plates being at most 5.8 times the thickness of the thinner one of the glass plates.

2 Claims, 6 Drawing Sheets

FIG.6 unit of dimension : mm

| spacing dimension (L0) | plate thickness : 3mm (t) | | plate thickness : 4mm (t) | | plate thickness : 5mm (t) | | plate thickness : 6mm (t) | | factor |
|---|---|---|---|---|---|---|---|---|---|
| | spacing dimension (L1) | evaluation | spacing dimension (L1) | evaluation | spacing dimension (L1) | evaluation | spacing dimension (L1) | evaluation | |
| 20 | 15.0 | ○ | 20.0 | ○ | 25.0 | ○ | 30.0 | ○ | 5.0 |
| | 16.5 | ○ | 22.0 | ○ | 27.5 | ○ | 33.0 | ○ | 5.5 |
| | 17.4 | ○ | 23.2 | ○ | 29.0 | ○ | 34.8 | ○ | 5.8 |
| | 18.0 | × | 24.0 | × | 30.0 | × | 36.0 | × | 6.0 |
| | 19.5 | × | 26.0 | × | 32.5 | × | 39.0 | × | 6.5 |
| | 21.0 | × | 28.0 | × | 35.0 | × | 42.0 | × | 7.0 |
| | 22.5 | × | 30.0 | × | 37.5 | × | 45.0 | × | 7.5 |
| 30 | 15.0 | ○ | 20.0 | ○ | 25.0 | ○ | 30.0 | ○ | 5.0 |
| | 16.5 | ○ | 22.0 | ○ | 27.5 | ○ | 33.0 | ○ | 5.5 |
| | 17.4 | × | 23.2 | × | 29.0 | × | 34.8 | × | 5.8 |
| | 18.0 | × | 24.0 | × | 30.0 | × | 36.0 | × | 6.0 |
| | 19.5 | × | 32.0 | × | 32.5 | × | 39.0 | × | 6.5 |
| | 21.0 | × | 28.0 | × | 35.0 | × | 42.0 | × | 7.0 |
| | 22.5 | × | 30.0 | × | 37.5 | × | 45.0 | × | 7.5 |

METHOD OF MANUFACTURING A GLASS
PANEL

This is a §371 of PCT/JP03/01953 filed Feb. 21, 2003, which claims priority from Japanese 2002-109444 filed Apr. 11, 2002, each of which are hereby incorporated by reference in their entireties.

TECHNICAL FIELD

The present invention relates to a method of manufacturing a glass panel and a glass panel manufactured by such a method, in which the glass panel comprises a pair of glass plates opposed to each other to define a void therebetween by a large number of space-maintaining members arranged along plate surfaces with predetermined intervals between rows, and a thermally meltable seal member for joining the glass plates throughout a circumference thereof to be hermetically sealed by a heat-joining process, the void between the glass plates being decompressed by a decompressing process.

BACKGROUND ART

In a conventional method of manufacturing a glass panel as noted above, a paste-like thermally meltable seal member is applied between the glass plates at the entire peripheries thereof, heated to 480° C. or above, for example, to be melted, and then cooled to room temperature to be hardened, thereby to execute a heat-joining process for joining both the glass plates throughout the circumference thereof to be hermetically sealed. After the heat-joining process is completed, that is, after the thermally meltable seal member is cooled to room temperature and hardened, a decompression process is executed to decompress the void between the glass plates.

However, since the void between the glass plates is decompressed after the thermally meltable seal member becomes hard, an internal stress is produced in the glass plates by atmospheric pressure acting on the glass surfaces. Specifically, an excessively long outer edge dimension between outermost rows of the space-maintaining members positioned closest to edges of the glass plates and the thermally meltable seal member could result in a great internal stress to damage the glass plates easily.

Under the circumstances, Applicant has conducted various experiments based on a finding that the internal stress produced in the glass plates is related to the thickness of the glass plates and the outer edge dimension noted above. As a result, it has been found that the outer edge dimension should be set not to exceed 13.2 times the thickness of the thinner of the glass plates in order to keep the internal stress produced in the glass plates within a long-term permissible strength (100 kgf/cm$^2$). A patent application describing this finding has been filed (see Patent Unexamined Publication No. 11-324509).

As in the prior art, the technique disclosed in the above-noted publication is also based on that the thermally meltable seal member is cooled and hardened after the heat-joining process is executed and then the decompression process is executed. Thus, the problem set forth below remains to be solved.

Having being heated to 480° C. or above in the heat-joining process, the glass plates generate inorganic substances containing Na while the thermally meltable seal member generates organic substances from a binder mixed in the seal member. These inorganic and organic substances could adhere to inner surfaces of the glass plates as a result of the cooling process, thereby to lower the quality of the glass panel due to a deterioration in permeability or the like. There is room for improvement in this respect.

The present invention has been made having regard to the conventional problem noted above, and its object is to provide a method of manufacturing a glass panel and a glass panel manufactured by such a method, in which the inorganic and organic substances generated in time of the heat-joining process are prevented from adhering to the inner surfaces of the glass plates as much as possible and yet the internal stress produced in the glass plates can be kept to a desired value or less.

DISCLOSURE OF THE INVENTION

Figure 1:
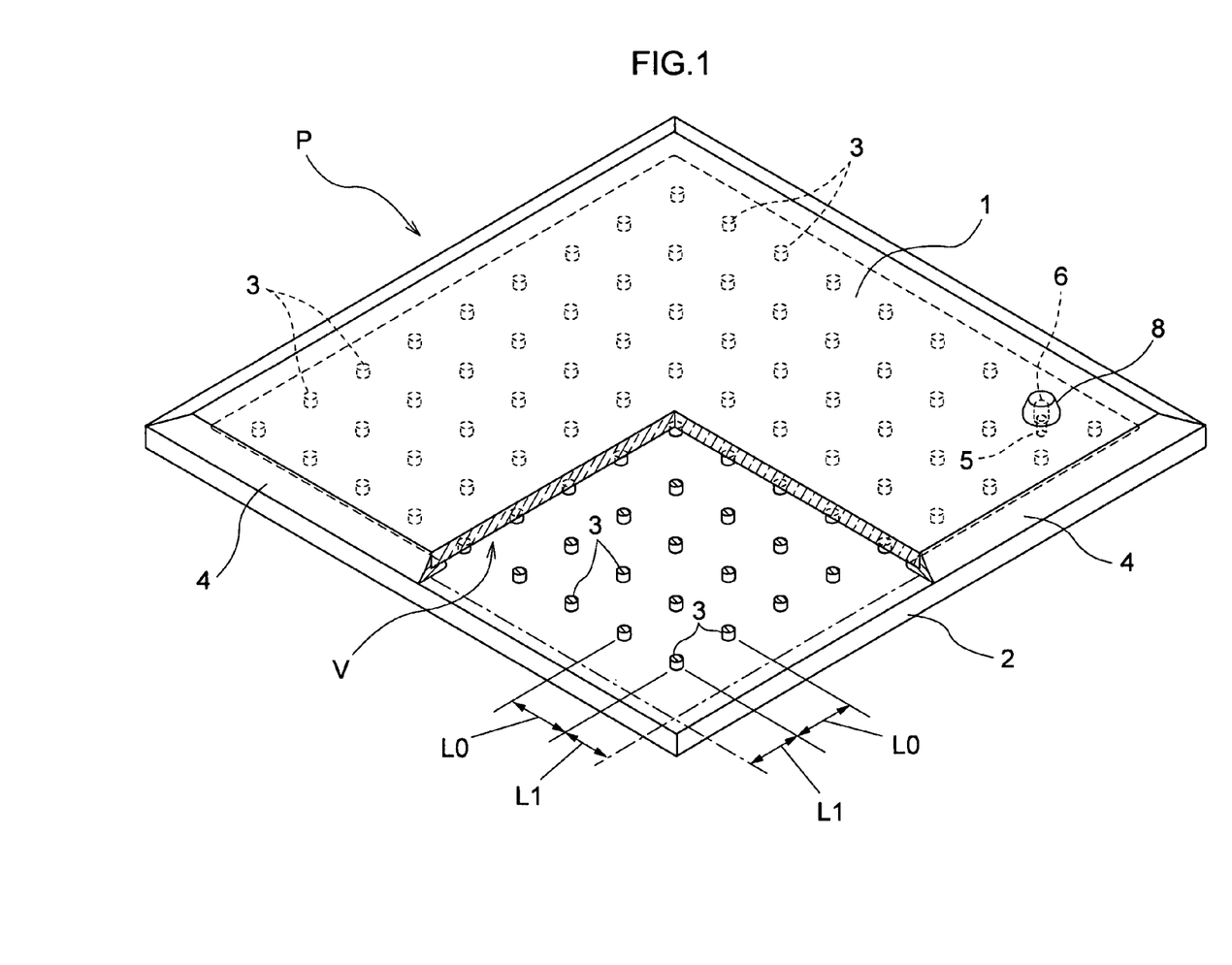
FIG. 1 is a partly cut away perspective view of a vacuum double glazing.
Figure 2:
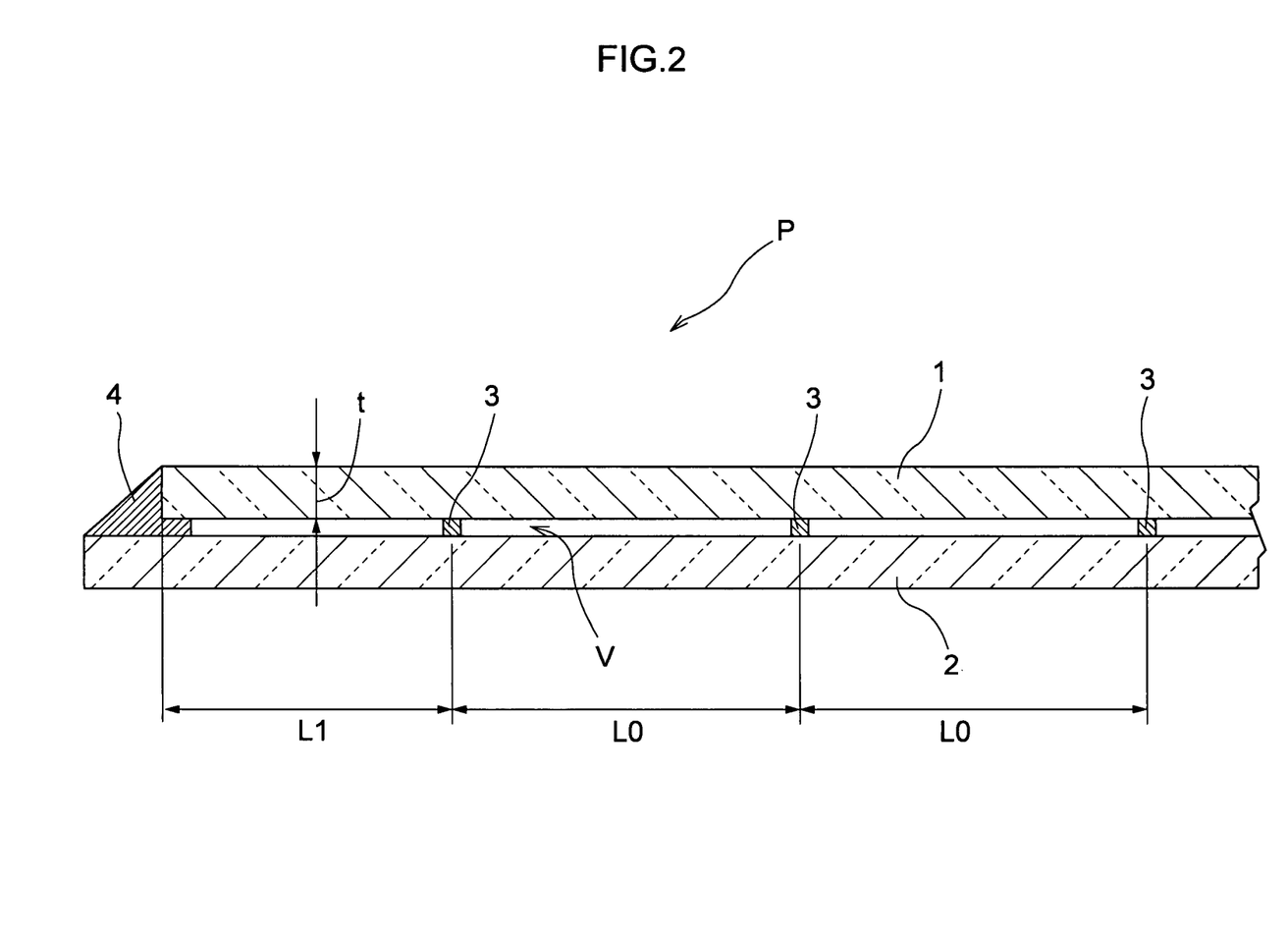
FIG. 2 is a sectional view of a principal portion of the vacuum double glazing.
Figure 3:
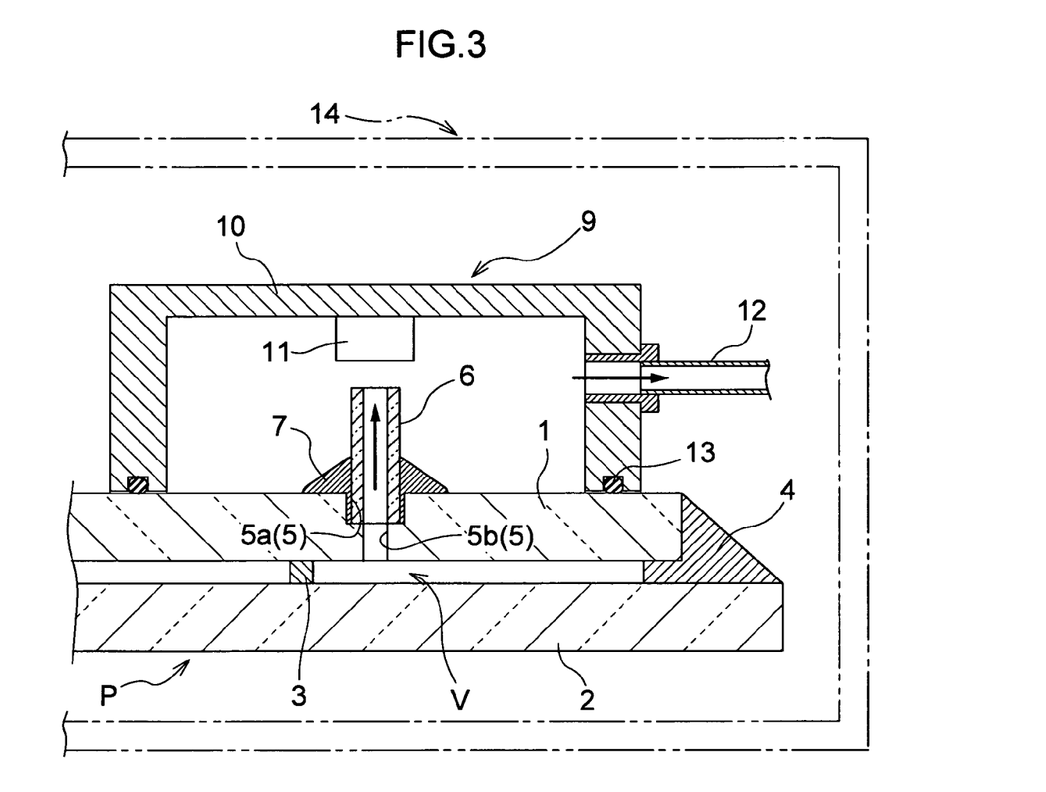
FIG. 3 is a sectional view of the vacuum double glazing and a decompression heating device in a manufacturing process.

The invention defined in Claim 1, as illustrated in FIGS. 1 through 3, is characterized by a method of manufacturing a glass panel comprising a pair of glass plates 1 and 2 opposed to each other to define a void V therebetween by a number of space-maintaining members 3 arranged along plate surfaces with predetermined intervals between rows, and a thermally meltable seal member 4 for joining the glass plates 1 and 2 throughout a circumference thereof to be hermetically sealed by a heat-joining process, the void V between the glass plates 1 and 2 being decompressed by a decompressing process, wherein a dimension L1 between outermost rows of the space-maintaining members 3 and peripheral edges of the glass plates 1 and 2 is set to at most 5.8 times the thickness t of the thinner one of the glass plates 1 and 2, and wherein the decompressing process is executed before cooling and hardening of the thermally meltable seal member 4 in the heat-joining process.

In the method of manufacturing the glass panel according to the present invention characterized by Claim 1, the decompressing process is executed for decompressing the void between the glass plates before cooling and hardening of the thermally meltable seal member in the heat-joining process for joining the glass plates throughout the circumference thereof to be hermetically sealed. Thus, most of inorganic and organic substances generated from the glass plates and the thermally meltable seal member in time of the heat-joining process are gasified and not yet completely adhering to inner surfaces of the glass plates when the decompressing process is performed.

Hence, the inorganic and organic substances are drawn and removed from the void between the glass plates in a decompressing operation, which suppresses adhesion of these substances to the inner surfaces of the glass plates, thereby to avoid a deterioration in the quality of the glass panel.

On the other hand, since the thermally meltable seal member is not completely hardened, the glass plates tend to bend such that the edges thereof may move closer to each other at a point of reaction force located on the outermost rows of the space-maintaining members when the decompressing process is performed. Thus, a new problem has risen that the internal stress concentrates in the vicinity of the outermost rows of the space-maintaining members from which the glass plates can be damaged.

As a result of various experiments conducted to solve this new problem, as apparent from the test results described later, it is confirmed that, even if the decompressing process is performed before the thermally meltable seal member is hardened, the internal stress concentrating in the vicinity of the outermost rows of the space-maintaining members may be suppressed to a predetermined value or less by setting the dimension between the outermost rows of the space-maintaining members and the peripheral edges of the glass plates to at most 5.8 times the thickness of the thinner one of the glass plates.

Consequently, according to the method of the present invention, the inorganic and organic substances generated by the heat-joining process are prevented from adhering to the inner surfaces of the glass plates of the glass panel, and further the glass panel can be realized in which the internal stress generated in the glass plates is suppressed to the predetermined value or less.

The invention claimed in Claim 2 is characterized in that the thickness t of the glass plates 1 and 2 is 3 mm or above.

With the construction of the invention characterized by Claim 2, since both the glass plates constituting the glass panel are 3 mm thick or above, each glass plate per se may have a predetermined rigidity. As apparent from the test results described later, the internal stress to be generated can be generally kept within a long-term permissible strength (100 kgf/cm$^2$).

The invention claimed in Claim 3, as illustrated in FIGS. 1 and 2, is characterized by the glass panel P manufactured by the manufacturing method claimed in Claim 1 or 2, in which a dimension L1 between an outermost rows of the space-maintaining members 3 and peripheral edges of the glass plates 1 and 2 is set to at most 5.8 times the thickness t of the thinner one of the glass plates 1 and 2.

With the construction characterized by Claim 3, in the glass panel manufactured by the manufacturing method claimed in Claim 1 or 2, the dimension between the outermost rows of the space-maintaining members and the peripheral edges of the glass plates is set to at most 5.8 times the thickness of the thinner one of the glass plates. Thus, as noted above, the glass panel realized is clean with the inner surfaces of the glass plates having only a minimal amount of residues of the inorganic and organic substances generated by the heat-joining process and also hard to damage with the internal stress being suppressed to the predetermined value or less.

While the above description includes reference numbers and symbols for expediency of comparison to the drawings, such inclusion does not limit the present invention to the construction shown in the accompanying drawings.

BEST MODE FOR CARRYING OUT THE INVENTION

An embodiment of a method of manufacturing a glass panel and a glass panel manufactured by such a method according to the present invention will be described hereinafter with reference to the drawings.

An example of such a glass panel is a vacuum double glazing. As shown in FIGS. 1 and 2, the vacuum double glazing P comprises a pair of glass plates 1 and 2 and numerous spacers 3 acting as space-maintaining members arranged along plate surfaces with predetermined intervals between rows. The glass plates 1 and 2 are arranged opposite each other with a void V defined therebetween by the spacers 3. Both of the glass plates 1 and 2 are joined throughout a circumference thereof by low melting point glass 4 acting as a thermally meltable seal member having a lower melting point and lower gas permeability than the glass plates 1 and 2, with the void V between the glass plates 1 an 2 being sealed in a decompressed condition.

Transparent float glass 3 mm thick (actually 2.65 to 3.2 mm thick due to thickness errors) is used for the glass plates 1 and 2. The void V defined between the glass plates 1 and 2 is decompressed to 1.33 Pa (1.0×10$^{-2}$ Torr) or less.

Figure 4:
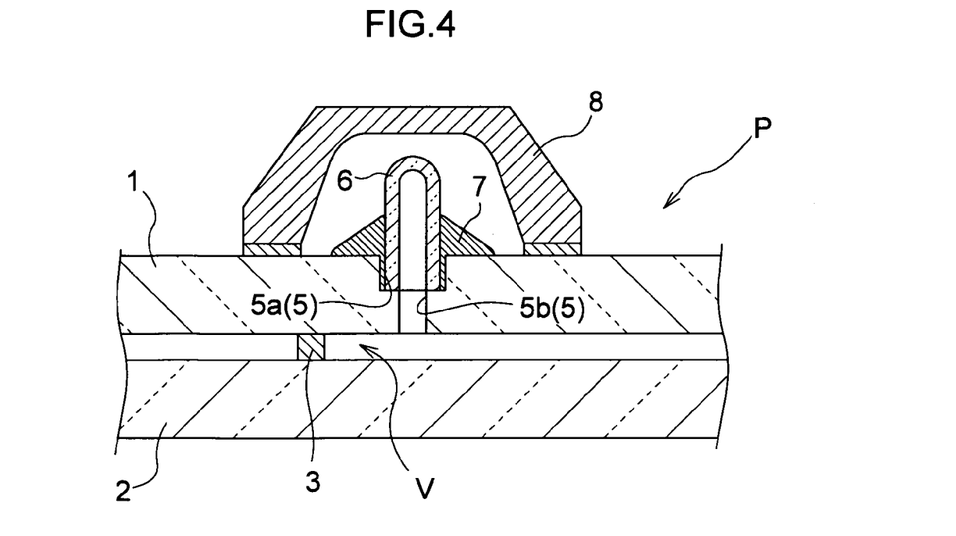
FIG. 4 is a sectional view of a principal portion of the vacuum double glazing.

While a process for decompressing the void V will be described in detail later, in order to decompress the void V, as illustrated in FIGS. 3 and 4, a suction bore 5 is formed in one of the glass plates 1, which bore includes a large bore 5a approximately 3 mm in diameter and a small bore 5b approximately 2 mm in diameter. A glass tube 6 is inserted into the large bore 5a, and is rigidly bonded to the glass plate 1 by low melting point glass 7 having a lower melting point than the glass tube 6 and glass plates 1 and 2. The glass tube 6 is melted and sealed at a distal end thereof and then entirely covered by a cap 8.

The spacers 3 preferably have a cylindrical configuration. They are made of a material having a compressive strength of at least 4.9×10$^8$ Pa (5×10$^3$ kgf/cm$^2$), e.g. stainless steel (SUS304), Inconel 718 or the like, to be capable of enduring atmospheric pressure acting on both of the glass plates 1 and 2. In the case of the cylindrical configuration, the spacers 3 are about 0.3 to 1.0 mm in diameter and about 0.15 to 1.0 mm in height.

A spacing dimension L0 between the spacers 3 is set to about 20 mm. A spacing dimension L1 between outermost rows of the spacers positioned closest to edges of the glass plates 1 and 2 and the peripheral edges of the glass plates 1 and 2, particularly, a spacing dimension L1 between the outermost rows of the spacers 3 and the peripheral edges of the smaller glass plate 1 where, as shown in FIG. 2, the peripheral edges of the glass plates 1 and 2 are not flush is set not to exceed 5.8 times the thickness t of the glass plates 1 and 2 (t×5.8). More particularly, the dimension L1 should be set not to exceed 3 mm×5.8=17.4 mm, which is about 15.0 mm in this embodiment.

Next, a method and a process of manufacturing the vacuum double glazing P exemplifying the glass panel will be described.

First, one of the pair of glass plates 2 not having the suction bore 5 formed therein is supported in a substantially horizontal position. The paste-like low melting point glass 4 is applied to a top surface of the glass plate at the peripheries thereof, and the numerous spacers 3 are arranged with the predetermined dimension L0 such that the dimension L1 may be approximately 15.0 mm which is less than 5.8 times the thickness t of the glass plates 1 and 2. Then, the other glass plate 1 is placed over the spacers.

In this arrangement, as illustrated in FIGS. 1 through 3, the lower glass plate 2 has a slightly larger area such that the peripheries of the lower glass plate may protrude from the peripheries of the upper glass plate 1. This is convenient for application of the low melting point glass 4. In this case, the spacing dimension L1 is a dimension between the peripheries of the upper glass plate 1 and the outermost rows of the spacers 3.

Subsequently, as shown in FIG. 3, the glass tube 6 is inserted into the suction bore 5 formed in the upper glass plate 1. The glass tube 6 is insertable only into the large bore 5a of the suction bore 5 and has a greater length than the large bore 5a. Thus, the glass tube 6 has an upper portion protruding upward from the glass plate 1. Around the protruding portion of the glass tube 6 is applied the low melting point glass 7 for adhering the glass tube 6 to the glass plate 1. Further, a decompression heating device 9 is placed from above.

The decompression heating device 9 includes a bottomed cylindrical suction cup 10 and an electric heater 11 provided within the suction cup 10. The device further includes a flexible suction pipe 12 communicating with an interior space of the suction cup 10, and an O-ring 13 for sealing the top surface of the glass plate 1.

Both of the glass plates 1 and 2, covered with the decompression heating device 9, are placed substantially horizontally in a heating furnace 14. The low melting point glass 4 is melted by baking to join the glass plates 1 and 2 at the entire peripheries thereof to seal the void V to complete a heat-joining process.

More particularly, the temperature in the heating furnace 14 is raised to 480° C. or above to melt the low melting point glass 4. Since the melted low melting point glass 4 has excellent wettability for the glass plates 1 and 2, both the glass plates 1 and 2 are reliably joined to each other. The low melting point glass 7 around the glass tube 6 is also melted along with melting of the low melting point glass 4 to flow into a gap between the large bore 5a and the glass tube 6 to reliably adhere the glass tube 6 to the glass plate 1.

After that, when the temperature of the heating furnace 14 is 400° C. or above, that is to say, before the low melting glass 4 melted by executing the heat-joining process is hardened by a subsequent cooling process, a decompression process is performed for drawing and removing gas from the void V through the glass tube 6 inserted into the suction bore 5. During the decompression process, the void V between the glass plates 1 and 2 is heated to perform what is known as a baking process.

More particularly, the interior of the suction cup 10 is decompressed by using a rotary pump or a turbo molecular pump connected to the flexible pipe 12 thereby to decompress the interior of the void V to 1.33 Pa or less through the glass tube 6 and the small bore 5b.

The void V defined between the glass plates 1 and 2 has been heated to 400° C. or above when the baking process is performed. Thus, inorganic substances including Na generated from the glass plates 1 and 2 in time of the heat-joining process and remaining within the void V, and organic substances generated from the low melting point glass 4 and remaining in the void V, have been gasified. Therefore, the inorganic and organic substances are reliably drawn and removed from the void V through the flexible pipe 12.

Subsequently, the distal end of the glass tube 6 is locally heated to approximately 1000° C. and melted by the electric heater 11. As illustrated in FIG. 4, the vacuum double glazing P is manufactured by sealing an opening at the distal end of the glass tube 6 and adhering the cap 8 to the glass plate 1 after the cooling process.

Various experiments have been conducted for confirming the effects obtained from the vacuum double glazing P manufactured by the above-noted method. Part of the experiments will be described below.

With respect to the internal stress generated in the glass plates 1 and 2 in the vicinity of the outermost rows of the spacers 3, four types of float glass plates of 3 mm, 4 mm, 5 mm and 6 mm in thickness t, respectively, were used as the glass plates 1 and 2. Test samples were prepared for each thickness t and further for seven cases in each thickness. The internal stress generated in the glass plates 1 and 2 was measured in the seven cases for each thickness where the spacing dimension L1 was increased every 2.5 mm from 10 mm to 25 mm.

Figure 5:
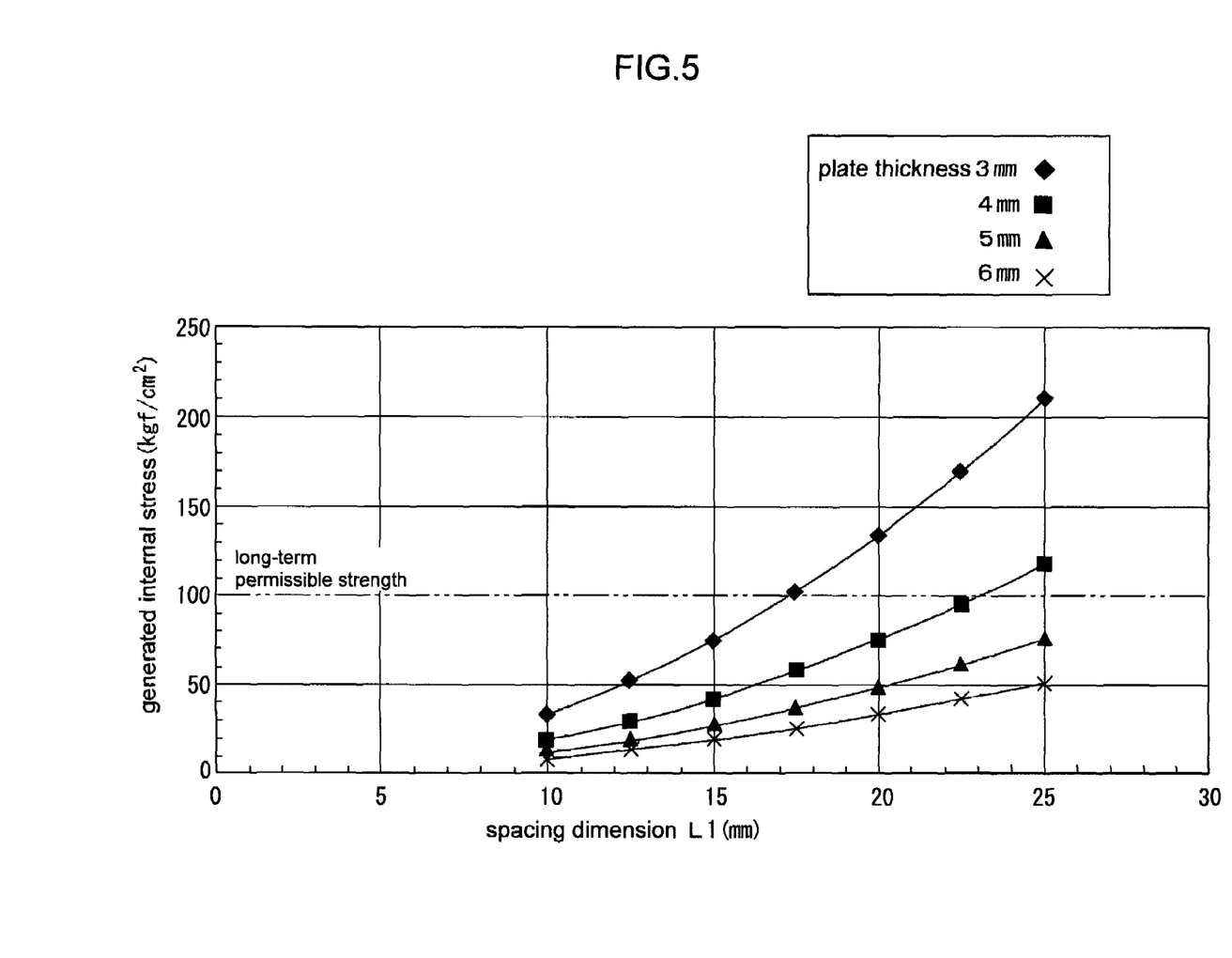
FIG. 5 is a graphic representation showing a relationship between an internal stress produced in the vacuum double glazing and a spacing dimension the vacuum double glazing.

FIG. 5 shows its results, from which it is confirmed that the internal stress generated in the glass plates 1 and 2 is kept within a long-term permissible strength of 100 kgf/cm$^2$ where glass plates 3 mm thick are used as the glass plates 1 and 2 and the dimension L1 is generally 17.4 mm or less.

Figure 7:
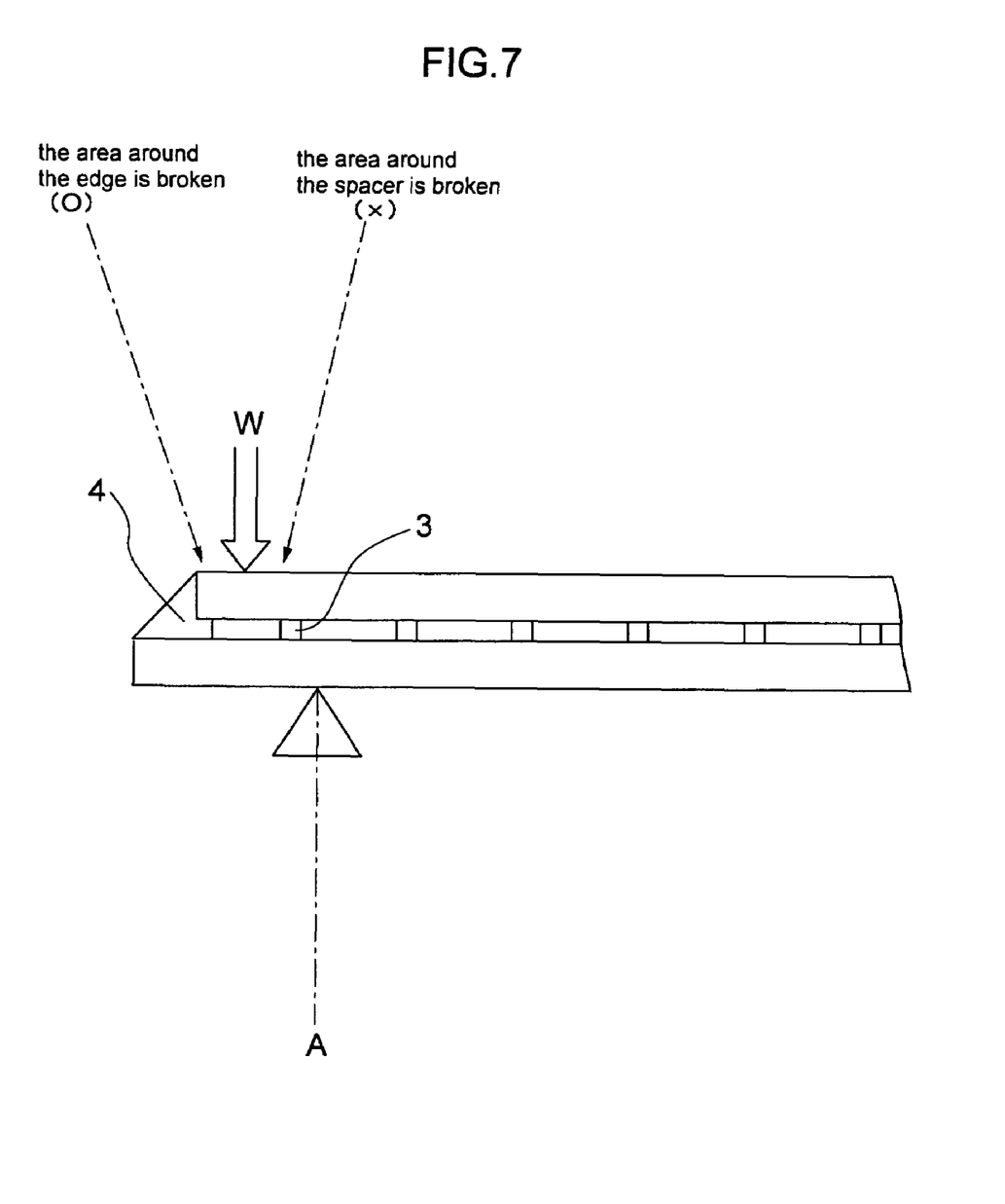
FIG. 7 is an explanatory view of the bending test of the vacuum double glazing.

Further, using the same float glass plates of 3 mm, 4 mm, 5 mm and 6 mm in thickness, test samples of the vacuum double glazing P were prepared for seven cases where the dimension L was increased by a small amount from 15.0 mm to 22.5 mm in the case of the glass plate 3 mm thick, for seven cases where the dimension L1 ranged from 20.0 mm to 30.0 mm in the case of the glass plate 4 mm thick, for seven cases where the dimension L1 ranged from 25.0 mm to 37.5 mm in the case of the glass plate 5 mm thick, and for seven cases where the dimension L ranged from 30.0 mm to 45.0 mm in the case of the glass plate 6 mm thick, respectively. As illustrated in FIG. 7, bending experiments were conducted in which each test sample was cantilevered at a support point A and a load W was applied to an end portion thereof. The load W was increased until the sample was damaged. Evaluation has been made based on each damage condition.

To make sure, additional test samples were prepared for the glass plates where the dimension L0 between the spacers 3 was 20 mm and 30 mm, respectively. The bending experiment was conducted for each sample.

The case where the glass plate is broken from its edge is evaluated as good (O) since the strength in an area around the outermost row of the spacers 3 is greater than the edge of the glass plate. The case where the glass plate is broken from the area around the outermost row of the spacers 3 is evaluated as poor (X) since the strength in the area around the outermost row of the spacers 3 is less than the edge of the glass plate. The experiments have been conducted three times for each sample. The glass plate broken from the area around the outermost row of the spacer 3 even once is evaluated as poor (X).

Figure 6:
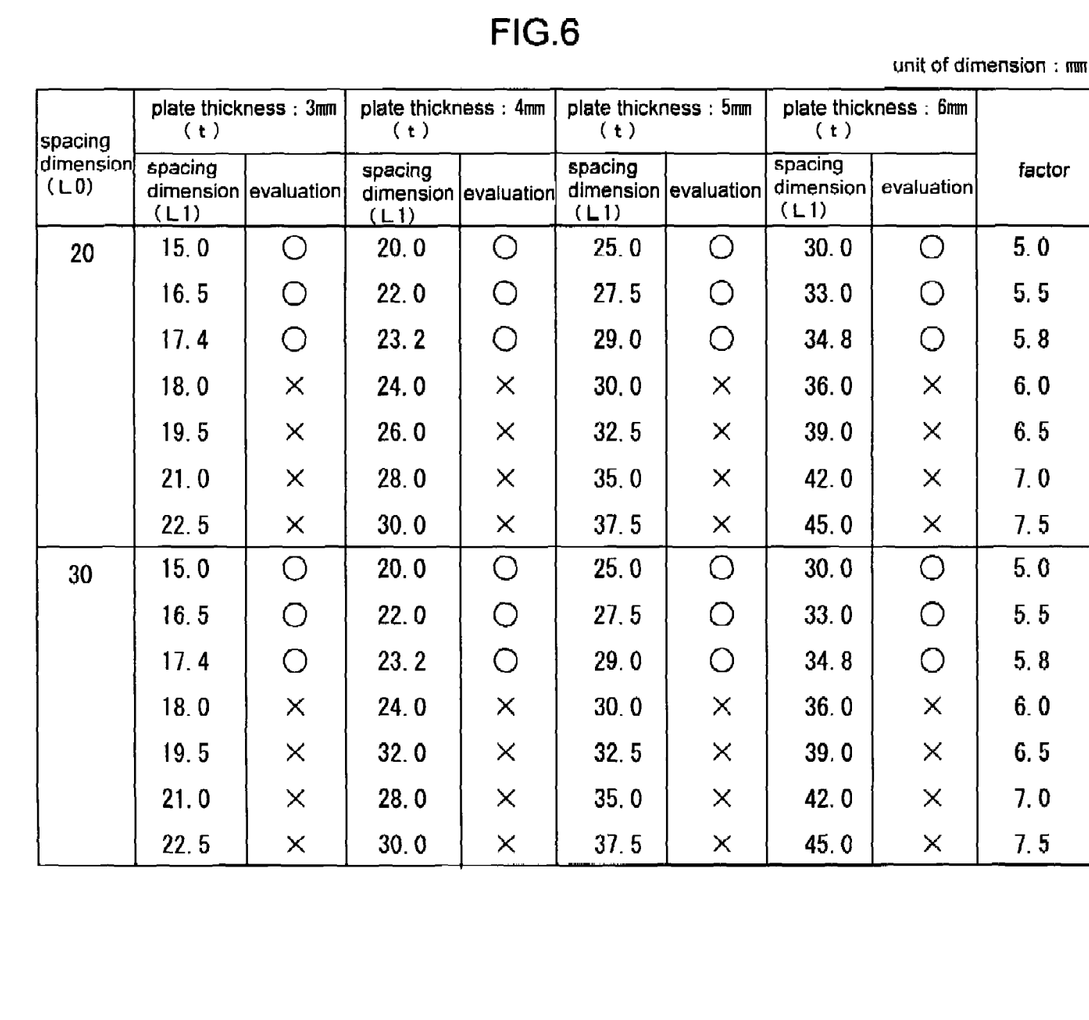
FIG. 6 is a table showing results of a bending test of the vacuum double glazing.

FIG. 6 shows test results, from which it is confirmed that the strength around the outermost row of the spacers 3 is hardly related with the dimension L0 between the spacers 3, but relies on the dimension L1 only.

Also, it is confirmed that in any of the four types of glass plates 3 mm through 6 mm thick, the stress concentrating around the outermost row of the spacers 3 may be kept to a predetermined value or less by setting the dimension L1 not to exceed a dimension corresponding to the thickness t of the glass plates multiplied by a coefficient of 5.8. When the thickness t is different between the glass plates 1 and 2, the dimension L1 should be determined based on the thickness of the thinner plate to be on the safe side, thereby to suppress the stress concentration around the outermost row of the spacers 3 to the predetermined value or less.

OTHER EMBODIMENTS (1) In the foregoing embodiment, the vacuum double glazing P is shown as one example of glass panels. Instead, the present invention may be applied to manufacture of a plasma display panel or the like in which the void V defined between the glass plates 1 and 2 is filled with gas. In such a case, the void V is filled with a predetermined gas after the baking process is executed.

The glass plates 1 and 2 constituting the glass panel are not limited to float glass as described in the foregoing embodiment, but a material may be selected as appropriate for various use and purposes of the glass panel. For example, it is possible to use, alone or in combination, figured glass, obscured glass having a light diffusing function obtained by a surface treatment, net glass, wire glass, tempered glass, double-reinforced glass, low-reflecting glass, high-penetrable sheet glass, ceramic print glass, or special glass having a heat-absorbing or ultraviolet-absorbing function. Further, with regard to glass composition, soda silica glass, soda lime glass, boric silica glass, aluminosilicate glass, and various types of crystallized glass may be used. The thickness of the glass plates 1 and 2 may also be selected as appropriate.

(2) In the first embodiment, the material for the spacers 3 is made from stainless steel or Inconel. Instead, it is possible to use metals including iron, copper, aluminum, tungsten, nickel, chromium and titanium, alloys such as carbon steel, chromium steel, nickel steel, nickel-chromium steel, manganese steel, chrome-manganese steel, chrome-molybdenum steel, silicon steel, brass, solder and duralumin, and ceramics or glass, which are not easily deformed by external forces. Each spacer is not limited to the cylindrical shape, but may be of various kinds of shape such as prismatic shape or spherical shape.

INDUSTRIAL UTILITY

Also, the glass panel may be used in various fields, e.g. for windowpanes of buildings and vehicles (automobiles, railway carriages, and ships and vessels), and elements of devices such as plasma displays, and doors and walls of various devices such as refrigerators and heat-retaining devices.

The invention claimed is:

1. A method of manufacturing a glass panel comprising the steps of:
    providing a pair of glass plates opposed to each other, each glass plate having plate surfaces;
    arranging a number of space-maintaining members along said plate surfaces with predetermined intervals between rows, thereby defining a void between said pair of glass plates; and
    joining said pair of glass plates throughout a circumference thereof with a thermally meltable seal member;
    hermetically sealing said thermally meltable seal member by a heat-joining process; and
    decompressing the void between said pair of glass plates by a decompressing process during a cooling process after the heat-joining process, wherein said decompressing process being effected before said thermally meltable seal member is hardened; and
    wherein the distance between outermost rows of said space-maintaining members and peripheral edges of said pair of glass plates is at most 5.8 times a thickness of a thinner glass plate of said pair of glass plates.

2. A method of claim 1, wherein the step of providing provides each glass plate having a thickness of at least 3 mm.

* * * * *